United States Patent
Johnson et al.

(10) Patent No.: US 8,526,876 B1
(45) Date of Patent: *Sep. 3, 2013

(54) TARGETED SATELLITE RADIO ADVERTISING USING MOBILE NETWORK DETERMINED LOCATION

(75) Inventors: Douglas A. Johnson, Overland Park, KS (US); Michael Williams, Raymore, MO (US); Roy Joseph, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 158 days.

This patent is subject to a terminal disclaimer.

(21) Appl. No.: 13/051,392

(22) Filed: Mar. 18, 2011

Related U.S. Application Data

(63) Continuation of application No. 11/876,047, filed on Oct. 22, 2007, now Pat. No. 7,945,204.

(51) Int. Cl.
*H04H 20/74* (2008.01)
*H04W 24/00* (2009.01)
*H04W 8/08* (2009.01)
*H04W 4/02* (2009.01)

(52) U.S. Cl.
USPC ..................... 455/3.02; 455/456.1

(58) Field of Classification Search
None
See application file for complete search history.

(56) References Cited

U.S. PATENT DOCUMENTS

| | | | |
|---|---|---|---|
| 2004/0198386 A1* | 10/2004 | Dupray | 455/456.1 |
| 2005/0033805 A1* | 2/2005 | Fujiyama et al. | 709/204 |
| 2005/0221843 A1* | 10/2005 | Friedman et al. | 455/456.6 |
| 2007/0146200 A1 | 6/2007 | Norin et al. | |
| 2008/0155587 A1 | 6/2008 | Sokola et al. | |

OTHER PUBLICATIONS

"XM Satellite Radio and Google Deliver Targeted Advertising to Satellite Radio Listeners; Partnership Will Connect XM Satellite Radio's Audience to Google's Expansive Network of Advertisers", Aug. 2, 2006, http://www.thefreelibrary.com/_/print/PrintArticle.aspx?id=148949617.

* cited by examiner

*Primary Examiner* — Philip Sobutka

(57) ABSTRACT

A method and system are provided for determining a location of a satellite radio receiver and directing advertisements to the satellite radio receiver based on its current location. The current location of the satellite radio receiver is determined through communication with a wireless mobile device and a wireless communications network where the wireless mobile device is located in close proximity to the satellite radio receiver. Once a location is determined, a database of satellite radio advertisements is searched to identify advertisements directed towards a specific location, and these advertisements are transmitted to the satellite radio receiver across a satellite radio network.

17 Claims, 5 Drawing Sheets

| SATELLITE RADIO ADVERTISEMENT DATABASE | | | |
|---|---|---|---|
| LOCATION: MIDWEST | | DATE: 09/10/2007 | |
| | | TIME: 10:15 AM | |
| AD IDENTIFICATION NUMBER | ADVERTISER | DURATION | LOCATION |
| 10684 | SPRINT CENTER | 0 M, 30 S | MISSOURI, KANSAS KANSAS CITY, MO |
| 23711 | KANSAS CITY AUTO REPAIR | 0 M, 30 S | KANSAS CITY, KS KANSAS CITY, MO |
| 24561 | KANSAS CITY DRIVE-IN MOVIE | 0 M, 20 S | KANSAS CITY, KS KANSAS CITY, MO |
| 25661 | KC BBQ | 0 M, 30 S | KANSAS CITY, MO |
| 30014 | FRED'S DINER | 0 M, 20 S | ST. LOUIS, MO |
| 31115 | FLOWER'S IN A MINUTE | 0 M, 30 S | COLUMBIA, MO |
| 32261 | BILL'S AUTOBODY | 0 M, 15 S | MANHATTAN, KS |

FIG. 4.

SATELLITE RADIO ADVERTISEMENT DATABASE

RECEIVER: US00104AQD67  DATE: 09/10/2007
CURRENT LOCATION: KANSAS CITY, MO  TIME: 10:15 AM
WIRELESS COMMUNICATION NETWORK SOURCE: SPRINT-NEXTEL

ADVERTISEMENT SEQUENCE
AD IDENTIFICATION

| NUMBER | ADVERTISER | DURATION | REPEAT |
|---|---|---|---|
| 10684 | SPRINT CENTER | 0 M, 30 S | YES |
| 23711 | KANSAS CITY AUTO REPAIR | 0 M, 30 S | NO |
| 24561 | KANSAS CITY DRIVE-IN MOVIE | 0 M, 20 S | NO |
| 25661 | KC BBQ | 0 M, 30 S | YES |

*FIG. 5.*

TARGETED SATELLITE RADIO ADVERTISING USING MOBILE NETWORK DETERMINED LOCATION

CROSS-REFERENCE TO RELATED APPLICATION

This application is a continuation of U.S. patent application Ser. No. 11/876,047 and assigned to the same assignee herein, and claims the benefit of the prior non-provisional application under 35 U.S.C. 120.

SUMMARY

The present invention is defined by the claims below. Embodiments of the present invention provide a method and system for, among other things, a satellite radio network having advertisements targeted to a specific listening audience. The present invention has several practical applications in the technical arts.

In a first aspect, a set of computer-usable instructions present a method of providing a location of a satellite radio receiver to a satellite radio system. The satellite radio receiver is in proximity to a wireless mobile device of a wireless communications network and sends a request to the wireless mobile device for the current location. The current location is retrieved from the wireless communications network and relayed to the satellite radio receiver. The wireless mobile device transmits the current location and identification data unique to the satellite radio receiver to a satellite radio network.

In a second aspect, a set of computer-useable instructions are provided for performing a method of determining a radio advertisement intended for a user of a satellite radio receiver. A current location for a wireless mobile device, which is also located in proximity to a satellite radio receiver, is determined, and along with the identifying data of the satellite radio receiver, is transmitted to a processing unit associated with a satellite radio network. A database portion of the processing unit is searched for at least one radio advertisement having content directed towards the current location of the satellite radio receiver. Once the radio advertisement is identified, it is transmitted to the satellite radio receiver and projected to a user of the satellite radio receiver.

In yet another aspect of the present invention, a satellite radio advertisement system is provided comprising a satellite transmission network, a satellite radio receiver in communication with the satellite radio network, and a processing unit in communication with the satellite radio network and a wireless communications network. A wireless mobile device, such as a wireless telephone, is in communication with both the wireless communications network and the satellite radio receiver. A current location of the satellite radio receiver is determined due to its proximity to the wireless mobile device and a satellite radio advertisement having subject matter directed towards the current location is sent to the satellite radio receiver.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4 depicts a database of satellite radio advertisements available for transmission to a satellite radio receiver based on a general location according to an embodiment of the present invention; and, FIG. 5 depicts a database of satellite radio advertisements available for transmission to a specific satellite radio receiver based on its current location according to an embodiment of the present invention.

DETAILED DESCRIPTION

Embodiments of the present invention provide systems and methods for providing advertisements to a user of a satellite radio receiver based upon the location of the satellite radio receiver and a wireless mobile device that is in communication with at least a wireless communications network. The satellite radio receiver utilizes a wireless mobile device and wireless communications network to identify its current location. This current location is utilized by a satellite radio network to identify one or more advertisements that are directed towards the user of the satellite radio receiver.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
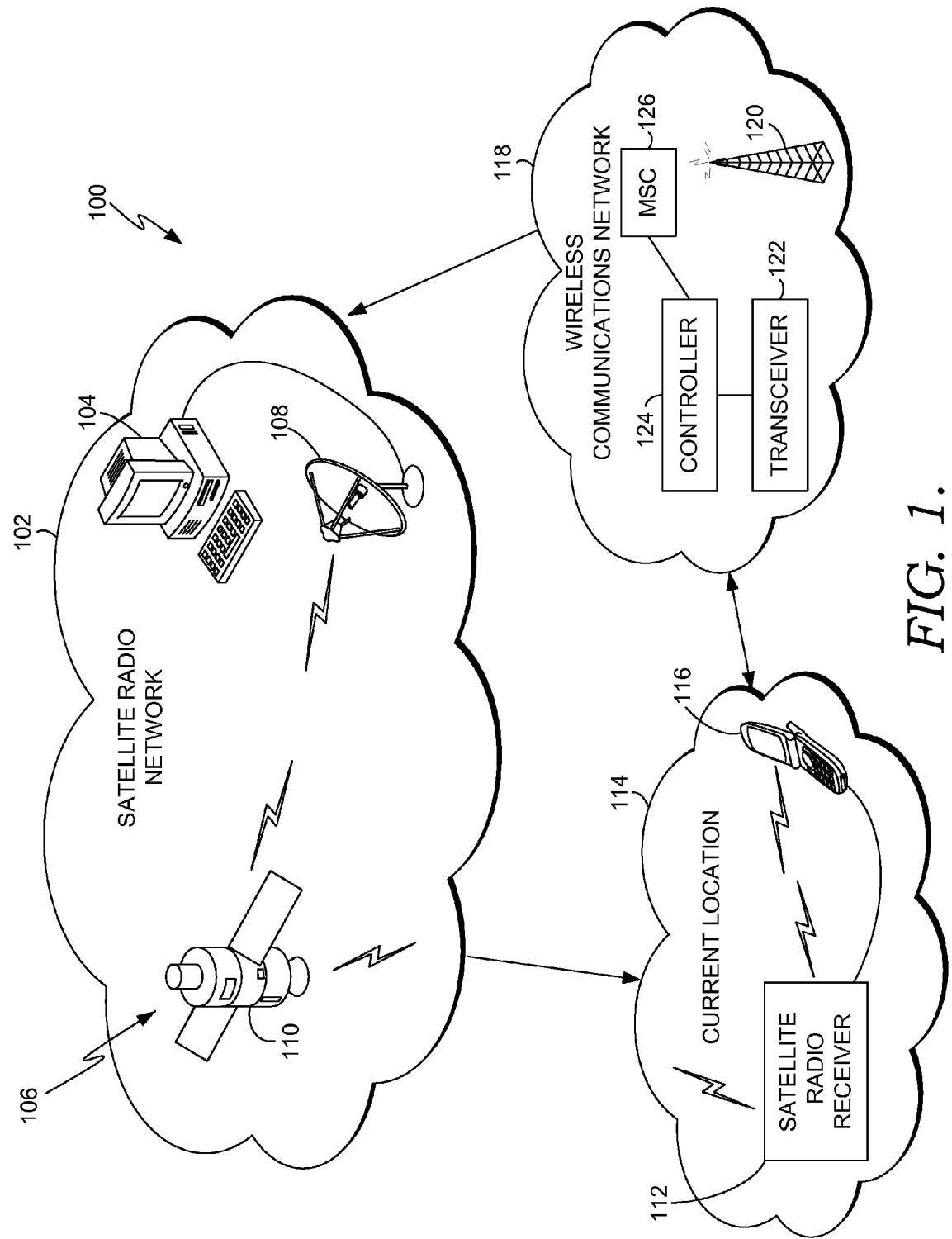
FIG. 1 depicts a system for delivering a radio advertisement targeted to a current location of a satellite radio receiver, according to an embodiment of the present invention.

Referring now to FIG. 1, a satellite radio advertisement system 100 is depicted and comprises a satellite radio network portion 102 having a processing unit 104 and a satellite transmission network 106. The processing unit 104, which contains at least a database of satellite radio advertisements intended for one or more specific geographic locations, is in communication with the satellite transmission network 106. Furthermore, the satellite transmission network 106 typically comprises one or more satellite dishes 108 receiving a data communication from the processing unit 104 and one or more satellites 110. Although the communication between the processing unit 104 and satellite dish 108 is shown as a wired connection, it is to be understood that data could be communicated wirelessly as well. The satellite radio network portion 102, and specifically the satellite transmission network 106, is in communication with a satellite radio receiver 112. The satellite radio receiver 112 is most commonly used in conjunction with audio equipment, such as a stereo, that is found in an automobile, truck, van, or other passenger transportation system. For the purposes of the present invention, the satellite radio receiver 112 is located within close proximity to a wireless mobile device 116. The exact proximity of the satellite radio receiver 112 to the wireless mobile device 116 can vary depending on a variety of factors such as satellite radio receiver capability and signal strength of the wireless mobile device. The communication between the wireless mobile device 116 and satellite radio receiver 112 can be wireless or at least a partially wired pathway, as depicted in FIG. 1.

An initial location of the satellite radio receiver 112 is entered by a user. However, given that the typical operating environment of the satellite radio receiver is in a mobile system, such as a vehicle, the current location 114 of the satellite radio receiver 112 and the wireless mobile device 116 will typically vary over a period of time and therefore must be updated periodically. This will be discussed in more detail below.

The wireless mobile device 116 is in contact with a wireless communications network 118. More specifically, the wireless mobile device 116 sends and receives radio signals through a tower 120 having a transceiver system 122, a number of which are typically connected to a controller 124. The controller 124 manages the communication between a number of transceivers 122 and a limited number of wireless mobile devices 116 compatible with the wireless communications network 118. The controller 124 connects to a mobile switching center 126 acting as a telephone exchange to handle the wireless mobile device activity through the associated one or more controllers 124 while connecting as needed to a public switched telephone network (PSTN).

The wireless communications network 118 is in communication with the wireless mobile device 116 and the satellite radio network 102. More specifically, the wireless communications network 118 can send radio signals to and receive radio signals from the wireless mobile device 116, as well as send data to the satellite radio network 102, more specifically the processing unit 104.

Through the wireless mobile device 116 and wireless communications network 118, a current location 114 is established for the satellite radio receiver 112. This is preferably accomplished through a global positioning system (GPS) feature associated with the wireless communications network 118 and wireless mobile device 116. The accuracy of the current location is a function of the GPS capability. The current location could be general, such as a city, or more specific, such as an intersection within the city. The current location 114 is identified such that a satellite radio advertisement stored in a database component associated with the processing unit 104 and having subject matter directed towards at least the current location 114 can be sent to the satellite radio receiver 112. This radio advertisement is sent to the satellite radio receiver 112 across satellite the satellite transmission network 106.

Figure 2:
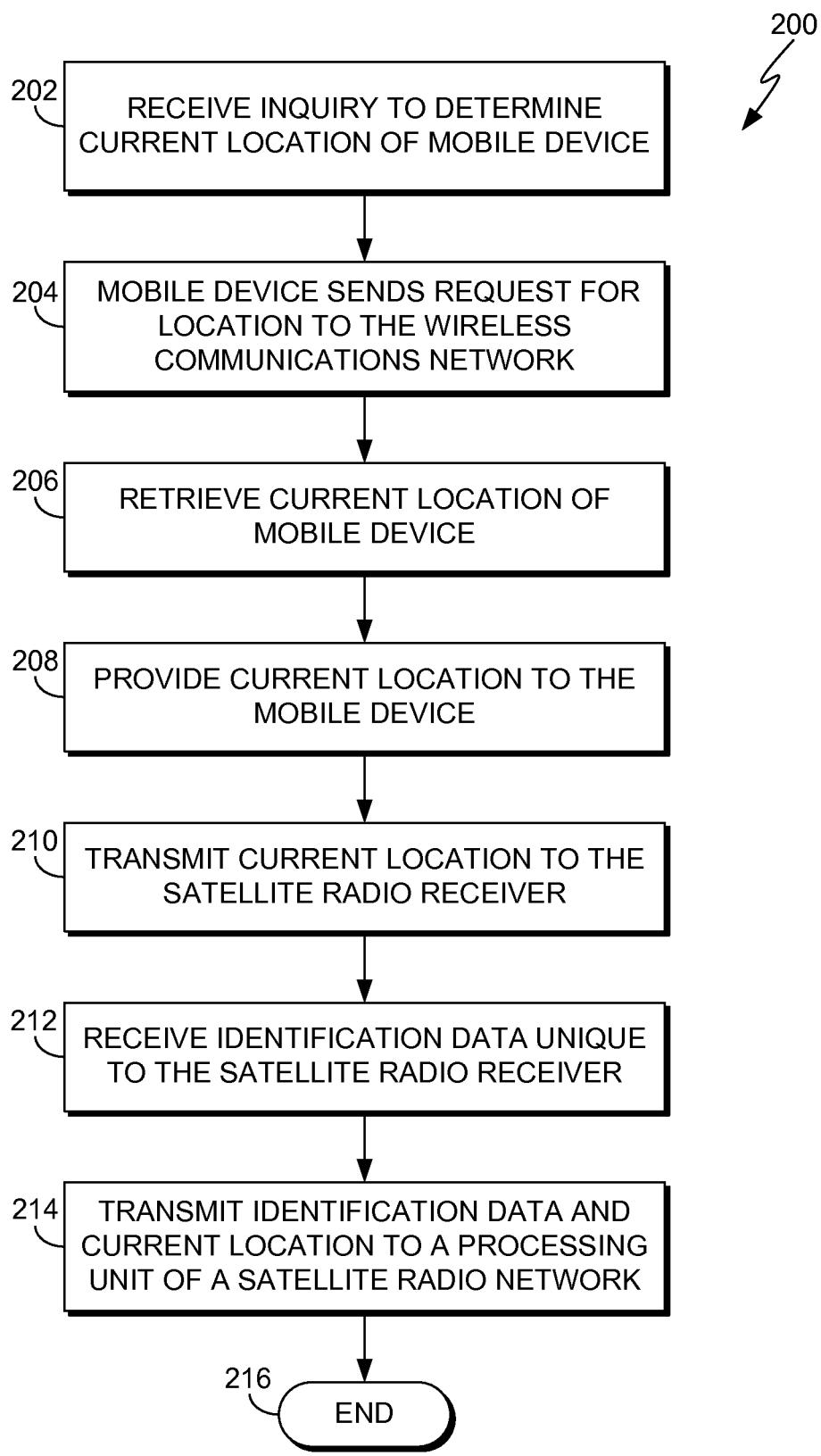
FIG. 2 is a flow diagram representative of a method for providing a location of a satellite radio receiver to a satellite radio network according to an embodiment of the present invention.

Referring now to FIG. 2, a method 200 is disclosed for providing a location of a satellite radio receiver 112, which is in proximity to a wireless mobile device 116, to a satellite radio network 102. In a step 202, an inquiry is received at the wireless mobile device 116 from the satellite radio receiver 112 to determine a current location of the wireless mobile device 116. The wireless mobile device 116 sends a request for the current location to the wireless communications network 118 in a step 204. In an alternate embodiment of the invention, the satellite radio receiver 112 and the wireless mobile device 116 can be a single device such that steps 202 and 204 are a single step.

The inquiry is transmitted to the wireless communications network 118 at a pre-determined interval so as to maintain a real-time location of the satellite radio receiver 112. The interval can vary and may be set by the satellite radio receiver user, the provider of the satellite radio network 102, or the provider of the wireless communications network 118. For example, if the interval is set for 60 seconds, and a vehicle carrying the satellite radio receiver 112 is moving at a typical highway speed, then the location would be updated approximately every mile. The satellite radio receiver 112 and wireless mobile device 116 can be connected across a partially wired pathway or a local wireless network such as Bluetooth®, Zigbee®, Wi-Fi, WiMAX, or other comparable network.

In a step 206, the current location of the wireless mobile device 116 is retrieved from the wireless communications network 118 and this current location is provided to the wireless mobile device 116 in a step 208. In a step 210, the current location is transmitted from the wireless mobile device 116 to the satellite radio receiver 112, such that the current location of the satellite radio receiver 112 is known.

In a step 212, identification data specific to the satellite radio receiver 112 is received at the wireless mobile device 116. The identification data comprises at least an electronic serial number that is unique to the satellite radio receiver 112. It is this electronic serial number that the satellite radio network 102 uses to communicate radio programming directly to the satellite radio receiver 112. In a step 214, the identification data and current location is transmitted through the wireless communications network 118 to the processing unit 104 of the satellite radio network 102. The process ends in a step 216.

Figure 3:
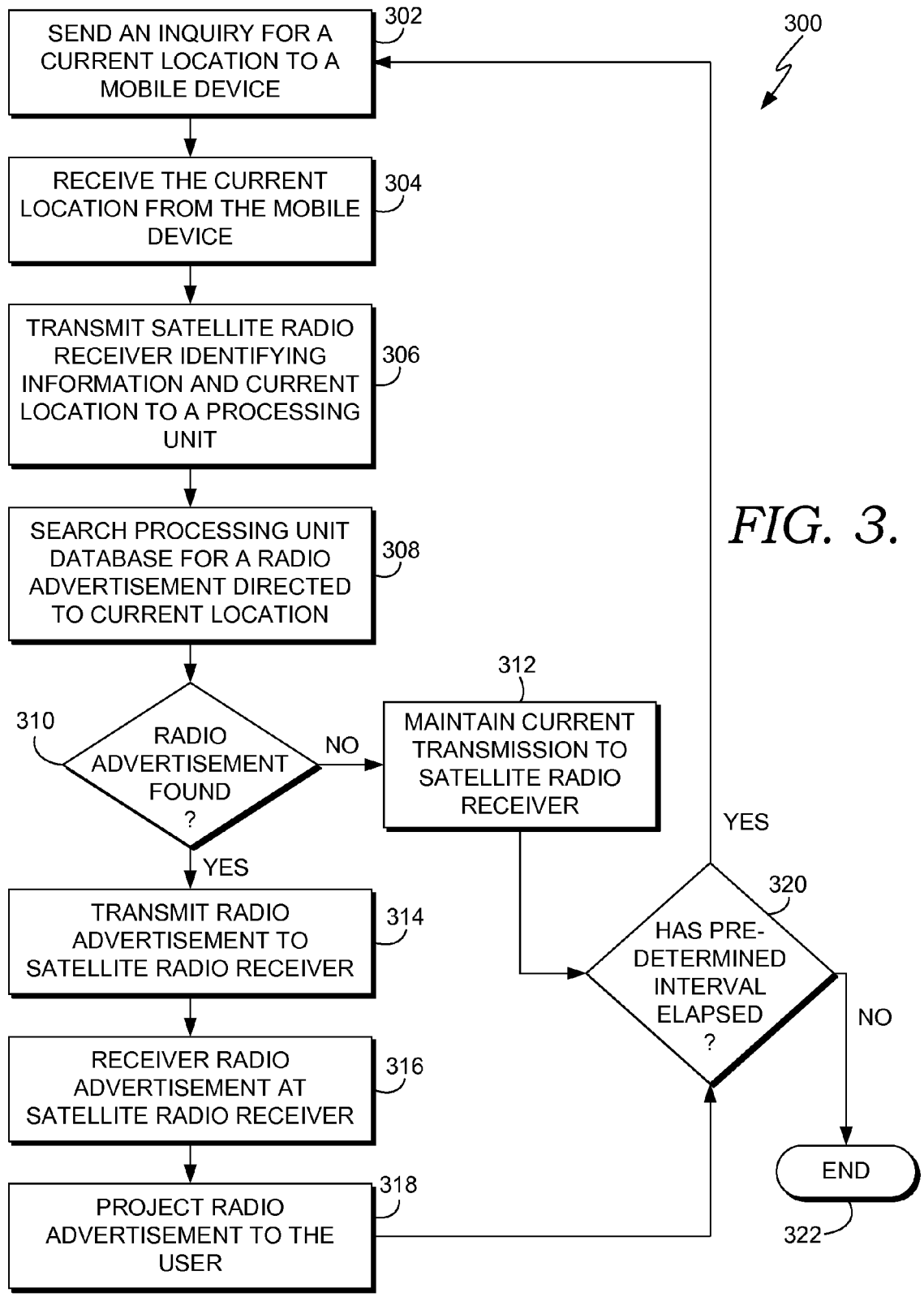
FIG. 3 is a flow diagram representative of a method of determining a radio advertisement intended for a user of a satellite radio receiver according to an embodiment of the present invention.

Referring now to FIG. 3, a method is disclosed for determining a radio advertisement that is intended for a user of a satellite radio receiver. The method 300 comprises a step 302 in which an inquiry for a current location is sent to a wireless mobile device 116. The inquiry is transmitted to the wireless communications network 118 at a pre-determined interval so as to maintain a real-time location of the satellite radio receiver 112. In a step 304, a response is received from the wireless mobile device 116 with the response including the current location of the wireless mobile device 116.

In a step 306, identifying data unique to the satellite radio receiver 112 and the current location of the wireless mobile device 116 is transmitted to the processing unit 104 associated with a satellite radio network 102. The identifying data comprises at least an electronic serial number unique to the satellite radio receiver 112. This transmission to the processing unit 104 occurs across the wireless communications network 118. In a step 308, a database portion of the processing unit 104 is searched for one or more radio advertisements having content directed towards the current location, where the current location is a geographic area such as a state, county, city, or zip code. In a step 310, a determination is made as to whether or not a radio advertisement meeting the location requirements has been found. If no radio advertisements are found in the database, then in a step 312, the current radio transmission is maintained to the satellite radio receiver 112.

If, in the step 310, a radio advertisement is found, then in a step 314, the radio advertisement is transmitted to the satellite radio receiver 112. In a step 316, the radio advertisement is received at the satellite radio receiver 112 and in a step 318, the radio advertisement is projected to the user through audio equipment associated with the satellite radio receiver 112.

In a step 320, a determination is made as to whether or not the pre-determined interval has elapsed, thereby requiring an update to the current location. If the pre-determined interval has elapsed, then the current location is to be updated and the process returns to step 302. If the pre-determined interval has not elapsed, the process ends in a step 322.

Referring now to FIGS. 4 and 5, embodiments of the database portion of the processing unit 104 are depicted for the satellite radio network 102. FIG. 4 depicts a database 400 of available advertisements 402 for a general location 404, such as the midwest region of the United States. This page of the database depicts a variety of businesses located in Kansas and Missouri that have advertisements 402 available for distribution across the satellite radio network 102. At this level of the database 400, the current location 114 of the satellite radio receiver 112 is not known. The information included in the database 400 includes a numerical identifier for each advertisement, the name of the advertiser, duration of the advertisement, and location for which the subject matter of the advertisement is targeted. For example, the advertiser corresponding to advertisement number 25661 is KC BBQ. The advertisement runs for 30 seconds and is directed towards listeners of the satellite radio network 102 that are presently in Kansas City, Mo. metropolitan area. Depending on the preferences set by the user or the satellite radio provider, this same advertisement could also be directed towards a user of a satellite radio receiver, whose position, by way of updating the current location, is determined to be heading towards the Kansas City, Mo. area.

Referring to FIG. 5, an embodiment of the database 500 is depicted in which information 502 pertaining to the satellite radio receiver 112 is listed. This information 502 includes an electronic serial number associated with the satellite radio receiver 112, its current location, and the wireless communications network provider. Also, depicted in FIG. 5 is a list 504 of satellite radio advertisements that are directed towards the current location of the satellite radio receiver 112. The list 504 in FIG. 5 is a filtered list of advertisements from the general midwest database depicted in FIG. 4. For example, the list 504 includes only advertisements that correspond to the current location (Kansas City, Mo.) of the satellite radio receiver 112. The other midwest advertisements are not selected since their targeted locations do not meet the current location of the satellite radio receiver 112.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of selecting an advertisement for playback by a satellite radio receiver, the method comprising:
   receiving a location of a wireless mobile device, where the wireless mobile device is in proximity to the satellite radio receiver;
   receiving identification data of the satellite radio receiver, wherein the identification data includes an electronic serial number;
   searching a database of a satellite transmission network for advertisements corresponding to the location of the wireless mobile device;
   selecting one or more radio advertisements for transmission and playback; and,
   transmitting the one or more advertisements from database to the satellite radio receiver using the identification data.

2. The method of claim 1, wherein the location of the wireless mobile device is determined through communication with a wireless communications network.

3. The method of claim 2, wherein the location of the wireless mobile device is transmitted to the satellite transmission network at a pre-determined interval so as to maintain a real-time location of the satellite radio receiver.

4. The method of claim 1, wherein the satellite radio receiver and the wireless mobile device communicate with each other across a local wireless network such as Bluetooth®, Zigbee®, or WiMAX.

5. The method of claim 1, wherein the satellite radio receiver and the mobile device are a single device.

6. The method of claim 1, wherein the satellite radio receiver is coupled to the wireless mobile device by a wired connection.

7. The method of claim 1, wherein the one or more advertisements are stored in the database and categorized according to an advertisement identification number, duration, location of advertiser, or advertiser name.

8. A system for storing and organizing a plurality of advertisements for selection and transmission to a satellite radio receiver based on a geographic location of the satellite radio receiver comprising:
   a plurality of data files having at least audio content related to a product or service;
   a database for the plurality of data files including an advertiser identification number, advertiser name, advertisement duration, and advertiser location;
   an indexing system for classifying the data files according to one or more of an advertisement identification number, advertiser name, advertisement duration, or advertiser location;
   identifying information for the satellite radio receiver, wherein the identifying information comprises a receiver identification number, current location of the satellite radio receiver, and a wireless communications network source; and
   a filtered list of data files selected as applicable to the satellite radio receiver based on its current location, wherein the data files are transmitted from the database to the satellite radio receiver using the receiver identification number.

9. The system of claim 8, wherein the database is accessed via a processing unit.

10. The system of claim 9, wherein the filtered list of data files is updated upon a change to the current location of the satellite radio receiver.

11. One or more non-transitory computer-readable media having computer-usable instructions embodied thereon for performing a method of determining an advertisement to play to a listener of a satellite radio program, the method comprising:
- utilizing a wireless mobile device to determine a current location of a satellite radio receiver;
- sending the current location of the satellite radio receiver to a processing unit of a satellite transmission network;
- sending an electronic serial number of the satellite radio receiver to the processing unit of the satellite transmission network;
- receiving from the processing unit one or more advertisements having an advertiser location in proximity to the current location of the satellite radio receiver; and
- playing the one or more advertisements from the filtered list over the satellite radio receiver using the electronic serial number.

12. The method of claim 11, wherein the current location of the wireless mobile device is transmitted to a satellite transmission network at a pre-determined interval so as to maintain a real-time location of the satellite radio receiver.

13. The method of claim 11, wherein the satellite radio receiver and the mobile device communicate with each other across a local wireless network.

14. The method of claim 11, wherein the satellite radio receiver and the mobile device are a single device.

15. The method of claim 11, wherein a wireless communications network is used to send the current location of satellite radio receiver to the satellite transmission network.

16. The method of claim 11, wherein the filtered list contains advertisements corresponding to the current location of the wireless mobile device.

17. The method of claim 16, wherein the satellite radio receiver receives an updated filtered list of advertisements upon a change in the current location of the satellite radio receiver.

* * * * *